United States Patent
Hundemer

(10) Patent No.: US 10,305,957 B2
(45) Date of Patent: May 28, 2019

(54) VIDEO PRODUCTION SYSTEM WITH DVE FEATURE

(71) Applicant: Tribune Broadcasting Company, LLC, Chicago, IL (US)

(72) Inventor: Hank J. Hundemer, Bellevue, KY (US)

(73) Assignee: Tribune Broadcasting Company, LLC, Chicago, IL (US)

( * ) Notice: Subject to any disclaimer, the term of this patent is extended or adjusted under 35 U.S.C. 154(b) by 0 days.

(21) Appl. No.: 15/212,634

(22) Filed: Jul. 18, 2016

(65) Prior Publication Data
US 2017/0019687 A1    Jan. 19, 2017

Related U.S. Application Data

(60) Provisional application No. 62/194,171, filed on Jul. 17, 2015, provisional application No. 62/242,593, filed on Oct. 16, 2015.

(51) Int. Cl.
*H04N 21/2187* (2011.01)
*H04L 29/06* (2006.01)
(Continued)

(52) U.S. Cl.
CPC .......... *H04L 65/607* (2013.01); *G06F 3/0482* (2013.01); *G06F 3/0486* (2013.01); *G06F 17/248* (2013.01); *G11B 27/00* (2013.01); *H04L 51/10* (2013.01); *H04L 51/32* (2013.01); *H04L 65/4076* (2013.01); *H04L 65/602* (2013.01); *H04L 65/604* (2013.01); *H04L 67/02* (2013.01); *H04L 67/10* (2013.01); *H04L 67/18* (2013.01); *H04L 67/306* (2013.01); *H04L 67/42* (2013.01);
(Continued)

(58) Field of Classification Search
CPC .................................................... H04N 21/235
See application file for complete search history.

(56) References Cited

U.S. PATENT DOCUMENTS

| | | | |
|---|---|---|---|
| 2005/0160452 A1* | 7/2005 | Lawler | H04N 5/44543 725/38 |
| 2009/0183201 A1* | 7/2009 | Dasgupta | G09B 7/00 725/40 |

(Continued)

OTHER PUBLICATIONS https://en.wikipedia.org/wiki/Meerkat_(app); Wikipedia Article on Meerkat (app); published May 29, 2015; retrieved Sep. 28, 2016.
(Continued)

*Primary Examiner* — Junior O Mendoza
(74) *Attorney, Agent, or Firm* — McDonnell Boehnen Hulbert & Berghoff LLP

(57) ABSTRACT

In one aspect, an example method is disclosed. The method includes (i) receiving, by a first computing system, from a second computing system, video content transmitted from the second computing system; (ii) determining, by the first computing system, a live/non-live characteristic of the transmission; (iii) using, by the first computing system, the determined live/non-live characteristic of the transmission, as a basis for selecting a digital-video effect (DVE); and (iv) executing, by the first computing system, the selected DVE, wherein executing the selected DVE causes the first computing system to generate video content.

12 Claims, 6 Drawing Sheets

(51) Int. Cl.
- *H04L 29/08* (2006.01)
- *H04L 12/58* (2006.01)
- *G06F 3/0486* (2013.01)
- *G06F 17/24* (2006.01)
- *H04N 21/262* (2011.01)
- *H04N 21/84* (2011.01)
- *H04N 21/234* (2011.01)
- *H04N 21/2665* (2011.01)
- *G06F 3/0482* (2013.01)
- *H04N 21/854* (2011.01)
- *G11B 27/00* (2006.01)

(52) U.S. Cl.
CPC ..... *H04N 21/23424* (2013.01); *H04N 21/262* (2013.01); *H04N 21/2665* (2013.01); *H04N 21/84* (2013.01); *H04N 21/854* (2013.01)

(56) References Cited

U.S. PATENT DOCUMENTS

| | | | |
|---|---|---|---|
| 2010/0121849 A1 | 5/2010 | Goeldi | |
| 2011/0040760 A1 | 2/2011 | Fleischman et al. | |
| 2013/0227596 A1* | 8/2013 | Pettis | H04N 21/2353 725/13 |
| 2013/0268962 A1 | 10/2013 | Snider et al. | |
| 2013/0304818 A1 | 11/2013 | Brumleve et al. | |
| 2014/0040371 A1 | 2/2014 | Gurevich et al. | |
| 2014/0125703 A1 | 5/2014 | Roveta et al. | |
| 2014/0280564 A1 | 9/2014 | Darling et al. | |
| 2014/0359656 A1* | 12/2014 | Banica | H04N 21/812 725/32 |
| 2015/0026728 A1* | 1/2015 | Carter | H04N 21/235 725/42 |
| 2015/0326819 A1* | 11/2015 | Veloso | H04N 5/262 348/589 |
| 2016/0381427 A1* | 12/2016 | Taylor | G06Q 30/00 725/13 |

OTHER PUBLICATIONS https://en.wikipedia.org/wiki/Periscope_(app); Wikipedia Article on Periscope (app); published May 26, 2015; retrieved Sep. 28, 2016.
https://about.tagboard.com/live; Tagboard Live Webpage; published Mar. 15, 2015; retrieved Sep. 28, 2016.
https://techcrunch.com/2013/11/25/tagboard-2-0/; Tagboard Revamps Its Cross-Platform Hashtag Aggregator; Anthony Ha; published Nov. 25, 2013; retrieved Sep. 28, 2016.
https://beta.stringr.com; Stringr Homepage; published Apr. 13, 2015; retrieved Sep. 28, 2016.
https://www.vidpresso.com/social; Vidpresso Social Homepage; published Jun. 27, 2015; retrieved Sep. 28, 2016.
https://techcrunch.com/2013/04/03/vidpresso-adds-photo-touchscreen-support-to-help-bring-twitter-to-tv/; Vidpresso Adds Photo, Touchscreen Support To Help Bring Twitter To TV; Ryan Lawler; published Apr. 3, 2013; retrieved Sep. 28, 2016.
https://techcrunch.com/2012/05/07/vidpresso-wants-to-help-tv-stations-put-your-tweets-and-facebook-comments-on-air/; Vidpresso Wants To Help TV Stations Put Your Tweets And Facebook Comments On Air; Frederic Lardinois; published May 7, 2012; retrieved Sep. 28, 2016.
https://techcrunch.com/2014/03/03/vidpresso-ads/; Ads To Broadcast TV; Ryan Lawler; published Mar. 3, 2014; retrieved Sep. 28, 2016.

* cited by examiner

| Story Title | Video Content Item Identifier | Duration | DVE Identifier |
| --- | --- | --- | --- |
| STORY A | VCI ID A | 00:02:00:00 | DVE ID A |
| STORY B | VCI ID B | 00:01:30:00 | |
| STORY C | | 00:00:30:00 | |
| STORY D | VCI ID D | 00:00:30:00 | |
| STORY E | VCI ID E | 00:00:30:00 | |
| COMMERCIAL BREAK | | | |
| STORY F | VCI ID F | 00:02:00:00 | DVE ID F |
| STORY G | | 00:01:30:00 | |
| STORY H | VCI ID H | 00:00:30:00 | |
| STORY I | VCI ID I | 00:00:30:00 | |

Figure 5

VIDEO PRODUCTION SYSTEM WITH DVE FEATURE

RELATED DISCLOSURES

This disclosure claims priority to (i) U.S. Provisional Patent Application No. 62/194,171, titled "Video Production System with Social Media Features," filed on Jul. 17, 2015, and (ii) U.S. Provisional Patent Application No. 62/242,593, titled "Video Production System with Content-Related Features," filed on Oct. 16, 2015, both of which are hereby incorporated by reference in their entirety.

USAGE AND TERMINOLOGY

In this disclosure, unless otherwise specified and/or unless the particular context clearly dictates otherwise, the terms "a" or "an" mean at least one, and the term "the" means the at least one.

SUMMARY

In one aspect, an example method is disclosed. The method includes (i) receiving, by a first computing system, from a second computing system, video content transmitted from the second computing system; (ii) determining, by the first computing system, a live/non-live characteristic of the transmission; (iii) using, by the first computing system, the determined live/non-live characteristic of the transmission, as a basis for selecting a digital-video effect (DVE); and (iv) executing, by the first computing system, the selected DVE, wherein executing the selected DVE causes the first computing system to generate video content.

In another aspect, an example non-transitory computer-readable medium is disclosed. The computer-readable medium has stored thereon program instructions that upon execution by a processor, cause performance of a first set of acts including (i) receiving, by a first computing system, from a second computing system, video content transmitted from the second computing system; (ii) determining, by the first computing system, a live/non-live characteristic of the transmission; (iii) using, by the first computing system, the determined live/non-live characteristic of the transmission, as a basis for selecting a DVE; and (iv) executing, by the first computing system, the selected DVE, wherein executing the selected DVE causes the first computing system to generate video content.

In another aspect, an example first computing system is disclosed. The first computing system is configured for performing a first set of acts including (i) receiving, by the first computing system, from a second computing system, video content transmitted from the second computing system; (ii) determining, by the first computing system, a live/non-live characteristic of the transmission; (iii) using, by the first computing system, the determined live/non-live characteristic of the transmission, as a basis for selecting a DVE; and (iv) executing, by the first computing system, the selected DVE, wherein executing the selected DVE causes the first computing system to generate video content.

BRIEF DESCRIPTION OF THE DRAWINGS

FIG. 5 is a simplified block diagram of an example program schedule.

DETAILED DESCRIPTION

I. Overview

Figure 1:
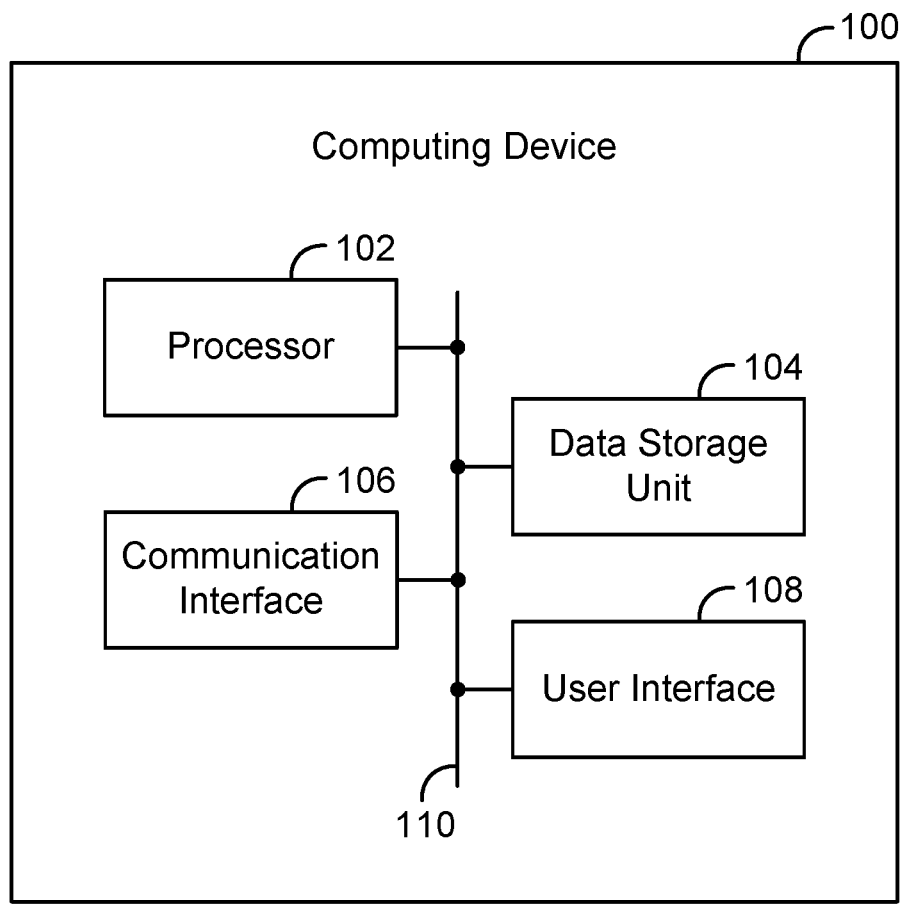
FIG. 1 is a simplified block diagram of an example computing device.

A video-production system (VPS) can generate video content that can serve as or be part of a video program (e.g., a news program). The VPS can then transmit the video content to a video-broadcast system (VBS), which in turn can transmit the video content to a first end-user device for presentation of the video content to an end-user.

The VPS can include various components to facilitate generating video content. For example, the VPS can include a video source, a DVE system, a scheduling system, and a sequencing system. The video source can generate video content, and can transmit the video content to the DVE system. The DVE system can use the video content and a DVE template to execute a DVE, which can cause the DVE system to generate new video content that is a modified version of the received video content. For example, the generated video content can include the received video content with local weather content overlaid thereon.

The scheduling system can create a program schedule, perhaps based on input received from a user (e.g., a producer or technical director) via a user interface. The sequencing system can process records in the program schedule, and based on the processed records, can control one or more components of the VPS, such as the video source and the DVE system, to facilitate generating video content.

In one example, the VPS can also include a second end-user device, a content system, and a character generator. The second end-user device can transmit media content to the content system. For example second end-user device can capture video content (e.g., using a camera) and can transmit the captured video content to the content system.

After the content system receives media content, the content system can then forward the received media content to the character generator. Alternatively, the content system can store the media content and later can retrieve and transmit the media content to the character generator.

The character generator can receive the media content from the content system. The character generator can then use the received media content to generate video content that includes the received media content. Further, the character generator can transmit the generated video content to the DVE system.

The DVE system can receive the video content and can execute a DVE, which causes the DVE system to generate video content that includes the received video content. The generated video content can serve as or be part of a video program. Thus, in this way, the VPS can integrate captured video content into a video program.

As discussed above, the second end-user device can transmit video content to the VPS, which the VPS can integrate into a video program. In one example, the second end-user device can capture video content and, at or about the same time that the video content is being captured (i.e., without significant delay), can transmit the captured video content to the content system. This can be referred to as a live video transmission. On the other hand, in the case where the second end-user device captures video content and, after a significant delay (e.g., a delay time that is longer than a delay typically associated with electronic communications between computing devices), transmits it to the content system, the transmission can be referred to as a non-live video transmission.

To improve the viewing experience for an end-user of the first end-user device who is viewing a video program that includes the video content provided by the second end-user device, it may be desirable to inform the end-user of this live/non-live characteristic. The VPS, the VBS, and/or components thereof can perform various acts and/or functions to help provide this feature.

First, the content system can receive from the second end-user device video content transmitted from the second end-user device. The content system can then determine a live/non-live characteristic of the transmission. The content system can then use the determined live/non-live characteristic of the transmission, as a basis for selecting a DVE. The DVE system can then execute the selected DVE, which can cause the DVE system to generate video content that includes the received video content.

To illustrate this concept, consider a first scenario where the content system determines that the transmission is a live transmission. In this case, the content system can use this determination as a basis to select a DVE that, when executed, causes the DVE system to generated video content by overlaying on the received video content, content indicating that the received video content is being transmitted live. For example, the overlay content can be the word LIVE or the phrase LIVE VIDEO.

To further illustrate this concept, consider a second scenario where the content system determines that the transmission is a non-live transmission. In this case, the content system can use this determination as a basis to select a DVE that, when executed, causes the DVE system to generated video content by overlaying on the received video content, content indicating that the received video content is not being transmitted live. For example, the overlay content can be the phrase RECORDED EARLIER or the phrase PREVIOUSLY RECORDED.

After the DVE system uses the selected DVE to generate video content video, the VBS can transmit the generated video content to the second end-user device for presentation of the generated video content to an end-user of the second end-user device as described above.

These features and related features are described in greater detail below.

II. Example Architecture

A. Computing Device

FIG. 1 is a simplified block diagram of an example computing device 100. The computing device can be configured to perform and/or can perform one or more acts and/or functions, such as those described in this disclosure. The computing device 100 can include various components, such as a processor 102, a data storage unit 104, a communication interface 106, and/or a user interface 108. Each of these components can be connected to each other via a connection mechanism 110.

In this disclosure, the term "connection mechanism" means a mechanism that facilitates communication between two or more components, devices, systems, or other entities. A connection mechanism can be a relatively simple mechanism, such as a cable or system bus, or a relatively complex mechanism, such as a packet-based communication network (e.g., the Internet). In some instances, a connection mechanism can include a non-tangible medium (e.g., in the case where the connection is wireless).

The processor 102 can include a general-purpose processor (e.g., a microprocessor) and/or a special-purpose processor (e.g., a digital signal processor (DSP)). The processor 102 can execute program instructions contained in the data storage unit 104 as discussed below.

The data storage unit 104 can include one or more volatile, non-volatile, removable, and/or non-removable storage components, such as magnetic, optical, and/or flash storage, and/or can be integrated in whole or in part with the processor 102. Further, the data storage unit 104 can take the form of a non-transitory computer-readable storage medium, having stored thereon program instructions (e.g., compiled or non-compiled program logic and/or machine code) that, upon execution by the processor 102, cause the computing device 100 to perform one or more acts and/or functions, such as those described in this disclosure. These program instructions can define and/or be part of a discrete software application. In some instances, the computing device 100 can execute program instructions in response to receiving an input, such as from the communication interface 106 and/or the user interface 108. The data storage unit 104 can also store other types of data, such as those types described in this disclosure.

The communication interface 106 can allow the computing device 100 to connect with and/or communicate with another other entity according to one or more protocols. In one example, the communication interface 106 can be a wired interface, such as an Ethernet interface or a high-definition serial-digital-interface (HD-SDI). In another example, the communication interface 106 can be a wireless interface, such as a cellular or WI-FI interface. In this disclosure, a connection can be a direct connection or an indirect connection, the latter being a connection that passes through and/or traverses one or more entities, such as a router, switcher, or other network device. Likewise, in this disclosure, a transmission can be a direct transmission or an indirect transmission.

The user interface 108 can include hardware and/or software components that facilitate interaction between the computing device 100 and a user of the computing device 100, if applicable. As such, the user interface 108 can include input components such as a keyboard, a keypad, a mouse, a touch-sensitive panel, and/or a media capturing device (e.g., a microphone and/or a camera), and/or output components such as a display device (which, for example, can be combined with a touch-sensitive panel), a sound speaker, and/or a haptic feedback system.

The computing device 100 can take various forms, such as a workstation terminal, a desktop computer, a laptop, a tablet, a mobile phone, a set-top box, and/or a television.

B. Video System

Figure 2:
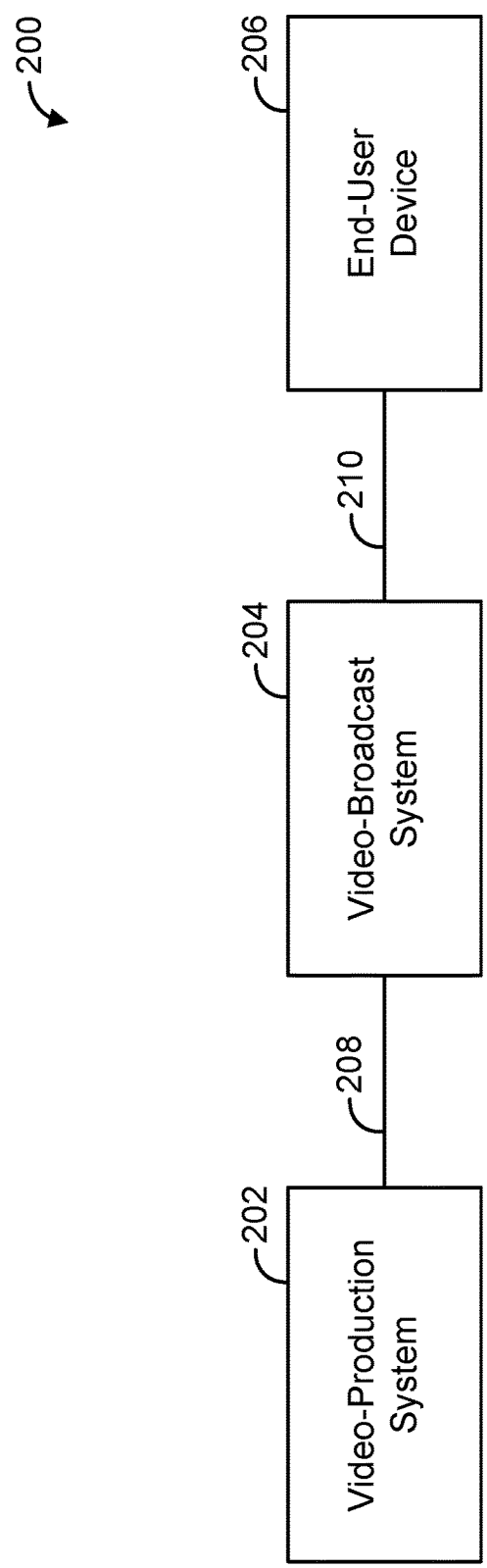
FIG. 2 is a simplified block diagram of an example video system.

FIG. 2 is a simplified block diagram of an example video system 200.

The video system 200 can perform various acts and/or functions related to video content, and can be implemented as a computing system. In this disclosure, the term "computing system" means a system that includes at least one computing device. In some instances, a computing system can include one or more other computing systems.

The video system 200 can include various components, such as a VPS 202, a VBS 204, and an end-user device 206, each of which can be implemented as a computing system. The video system 200 can also include a connection mechanism 208, which connects the VPS 202 with the VBS 204;

and a connection mechanism 210, which connects the VBS 204 with the end-user device 206.

Figure 3:
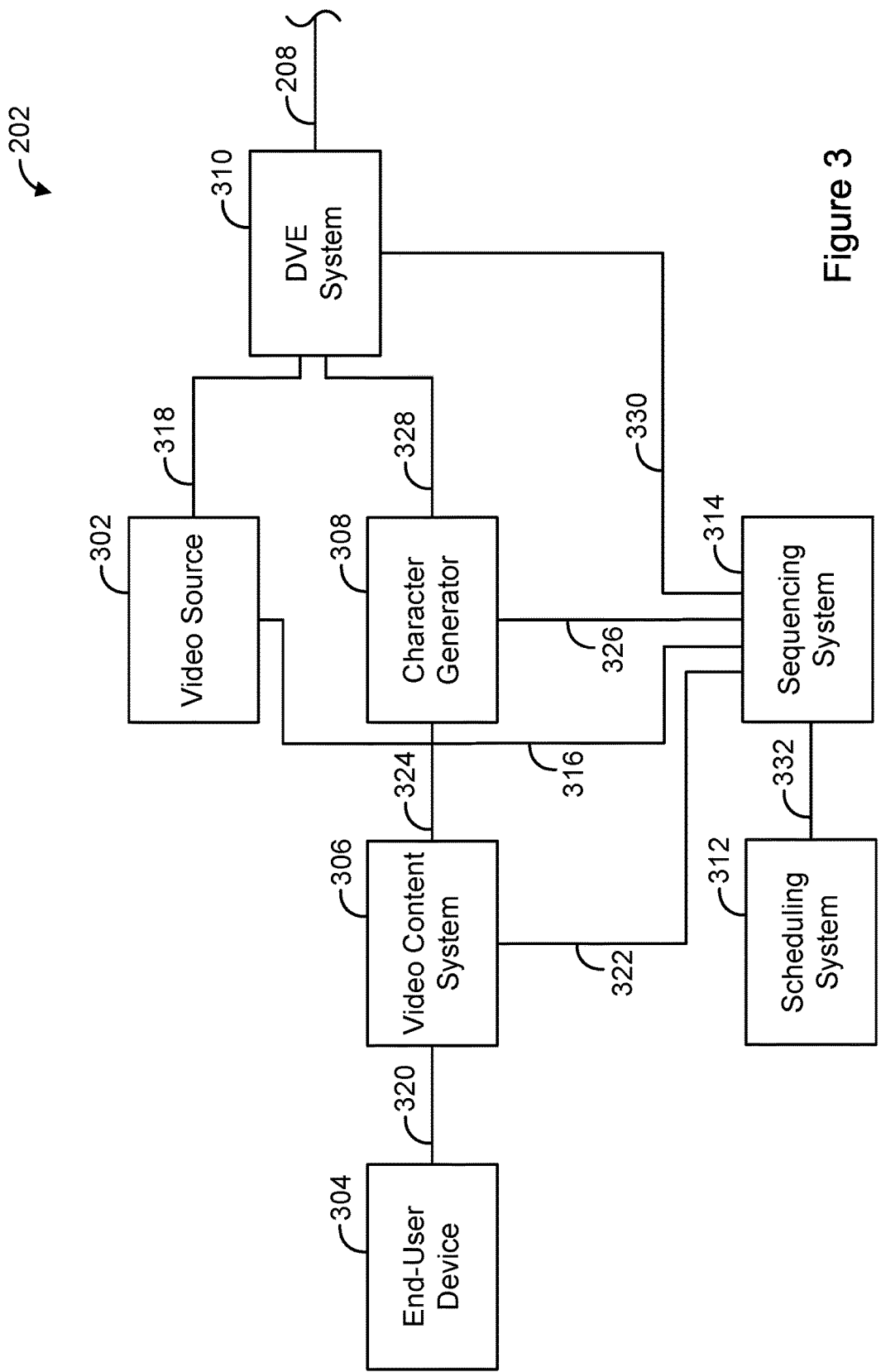
FIG. 3 is a simplified block diagram of an example video production system.

FIG. 3 is a simplified block diagram of an example VPS 202. The VPS 202 can include various components, such as a video source 302, an end-user device 304, a content system 306, a character generator 308, a digital video-effect (DVE) system 310, a scheduling system 312, and a sequencing system 314, each of which can be implemented as a computing system. The VPS 202 can also include a connection mechanism 316, which connects the video source 302 with the sequencing system 314; a connection mechanism 318, which connects the video source 302 with the DVE system 310; a connection mechanism 320, which connects the end-user device 304 with the content system 306; connection mechanism 322, which connects the content system 306 with the sequencing system 314; a connection mechanism 324, which connects the content system 306 with the character generator 308; a connection mechanism 326, which connects the character generator 308 with the sequencing system 314; a connection mechanism 328, which connects the character generator 308 with the DVE system 310; a connection mechanism 330, which connects the DVE system 310 with the sequencing system 314; and a connection mechanism 332, which connects the scheduling system 312 with the sequencing system 314.

The video source 302 can take various forms, such as a video server, a video camera, a satellite receiver, a character generator, or a DVE system. An example video server is the K2 server provided by Grass Valley of San Francisco, Calif.

The character generator 308 can take various forms. An example character generator is the VIZ TRIO provided by Viz Rt of Bergen, Norway. Another example character generator is CASPAR CG developed and distributed by the Swedish Broadcasting Corporation (SVT).

The DVE system 310 can take various forms, such as a production switcher. An example production switcher is the VISION OCTANE production switcher provided by Ross Video Ltd. of Iroquois, Ontario in Canada.

The scheduling system 312 can take various forms. An example scheduling system is WO TRAFFIC provided by WideOrbit, Inc. of San Francisco, Calif. Another example scheduling system is OSI-TRAFFIC provided by Harris Corporation of Melbourne, Fla.

The sequencing system 314 can take various forms. A sequencing system is sometimes referred to in the industry as a "production automation system."

Referring back to FIG. 2, the VBS 204 can include various components, such as a terrestrial antenna or a satellite transmitter, each of which can be implemented as a computing system.

Each of the video-based entities described in this disclosure can include or be integrated with a corresponding audio-based entity. Also, the video content described in this disclosure can include or be integrated with corresponding audio content. More generally, the entities can be media-based entities such as a media production system (MPS) and a media broadcast system (MBS).

III. Example Operations

The video system 200 and/or components thereof can perform various acts and/or functions. These features and related features will now be described.

The video system 200 can perform various acts and/or functions related to video content. For example, the video system 200 can receive, generate, output, and/or transmit video content that can serve as or be part of a video program (e.g., a news program). In this disclosure, the act of receiving, generating, outputting, and/or transmitting video content can occur in various ways and/or according to various standards. For example, the act of receiving, outputting, and/or transmitting video content can include receiving, outputting, and/or transmitting a video stream representing the video content, such as over Internet Protocol (IP) or in accordance with the high-definition serial digital interface (HD-SDI) standard. Likewise, the act of generating content can include generating a video stream representing the video content. Also, the act of receiving, generating, outputting, and/or transmitting video content can include receiving, generating, outputting, and/or transmitting an encoded or decoded version of the video content.

The VPS 202 can perform various acts and/or functions related to video content production. For example, the VPS 202 can generate and/or output video content, and can transmit the video content to another entity, such as the VBS 204.

Referring back to FIG. 3, within the VPS 202, the video source 302 can generate and/or output video content, and can transmit the video content to another entity, such as the DVE system 310. In practice, the VPS 202 is likely to include multiple video sources and corresponding connection mechanisms, each connecting a respective one of the video sources with the DVE system 310.

As noted above, the video source 302 can take the form of a video server. A video server can record and/or store video content (e.g., in the form of a file). Further, the video server can retrieve stored video content and can use the retrieved video content to generate and/or output a video stream representing the video content. This is sometimes referred to in the industry as the video server playing out the video content. The video server 302 can then transmit the video stream, thereby transmitting the video content, to another entity, such as the DVE system 310.

The end-user device 304 can perform various acts and/or functions related to media content, perhaps based on input received from a user (e.g., a field reporter) via a user interface. For example, the end-user device 304 can obtain and/or generate media content. In one example, the end-user device can to this by using a video capturing device (e.g., a camera) of the end-user device 304 to capture video content. In one use case, this can allow the end-user device 304 to capture video content of a newsworthy event, such that it can be integrated into a news program. In another example, the end-user device 304 can download media content from a media source.

The end-user device 304 can then transmit the media content to another entity, such as the content system 306. In one example, the end-user device 304 can store the media content in a data storage unit (e.g., a data storage unit of the end-user device 304). At a later time, the end-user device 304 can select and/or retrieve the stored media content, and can transmit it to another entity, such as the content system 306. In one example, the end-user device 304 can use one software application to capture and store video content, and can then use another software application to select, retrieve, and transmit the video content.

In another example, the end-user device 304 can capture video content and, at or about the same time that the video content is being captured (i.e., without significant delay), can transmit the captured video content to another entity, such as the content system 306. This is sometimes referred to in the industry as a live video transmission or a live video stream. As such, in this instance, the transmission of video content would have a live characteristic. This can be contrasted with the example described in the paragraph above, where the transmission of video content would have a non-live characteristic. Notably, even when the end-user device 304 is transmitting video content in this manner, the end-user device 304 can still store, select, and/or retrieve the video content as part of this process. For instance, the end-user device 304 can store the video content in, and can retrieve it from, a memory buffer to facilitate the receipt and transmission of the video content. In one example, the end-user device 304 can use one software application to both capture and transmit video content in this manner.

In some cases, the end-user device 304 can determine data related to captured video content, which the end-user device 304 can transmit along with the video content (e.g., as metadata). For example, the end-user device 304 can determine a location of the end-user device 304 (e.g., in the form of global positioning system (GPS) coordinates) where it was capturing video content. As another example, the end-user device 304 can determine a date and/or time when the end-user device 304 was capturing video content.

Also, in the case where the end-user device 304 is transmitting video content to another entity (e.g., the content system 306), the end-user device 304 can also determine data related to the transmission of the video content, which the end-user device 304 can transmit along with the video content (e.g., as metadata). For example, the end-user device 304 can determine a live/non-live characteristic of the transmission. For instance, in the case where the end-user device 304 is operating in a first mode, which allows the end-user device 304 to retrieve stored video content (e.g., previously captured video content) and to transmit the retrieved video content to another entity, the end-user device 304 can, based on the end-user device 304 operating in the first mode, determine that the transmission is a non-live transmission. Alternatively, in the case where the end-user device 304 is operating in a second mode, which allows the end-user device 304 to capture video content and to, at or about the same time, transmit the captured video content to another entity, the end-user device 304 can, based on the end-user device 304 operating in the second mode, determine that the transmission is a live transmission.

Like the end-user device 304, the content system 306 can perform various acts and/or functions related to media content, perhaps based on input received from a user (e.g., a producer or technical director) via a user interface. For example, the content system 306 can receive media content and can do so in various ways. In one example, the content system 306 can receive media content from another entity, such as the end-user device 304.

The content system 306 can also store, select, and/or retrieve media content. As such, the content system 306 can store received media content in a data storage unit (e.g., a data storage unit of the content system 306), and can then receive the media content by selecting and retrieving it from the data storage unit. The content system 306 can also perform similar acts in connection with data relating to media content, such as data relating to video content, as discussed above.

The content system 306 can also modify video content and/or related data, and can do so in various ways. In one example, the content system 306 can modify video content using a video-editing software application. Among other things, this can allow the content system 306 to removing vulgarities, personal information, and/or extraneous information that is not suitable or desirable for integration into a video program. In another example, the content system can modify the related data by adding a unique identification (ID) number to the data to facilitate managing the corresponding video content. In another example, the content system can add a tag, keyword, or description to the corresponding video content.

The content system 306 can also transmit media content to another entity, such as the character generator 308. In some cases, receiving and transmitting media content can include forwarding the media content. In other cases, receiving and transmitting media content can include receiving the media content and transmitting a copy of the media content. As such, in one example, the content system 306 can receive video content from the end-user device 304, and can transmit a copy of the video content to the character generator 308.

In one example, the content system 306 can receive media content from the end-user device 304 and, at or about the same time that the media content is being received (i.e., without significant delay), can transmit the media content to another entity, such as the character generator 308. Notably, even when the content system 306 is transmitting media content in this manner, the content system 306 can still store, select, and/or retrieve the media content as part of this process. For instance, the content system 306 can store the media content in, and can retrieve it from, a memory buffer to facilitate the receipt and transmission of the media content.

The content system 306 can also perform various acts and/or functions related to SM content. In this disclosure, "SM content" is content that has been published on a SM platform, which is a computer-based tool that allows users to create, share, and/or exchange content (e.g., in the form of text, images, and/or videos) in virtual communities on a computer-based network such as the Internet. Examples of SM platforms include TWITTER, YOUTUBE, FACEBOOK, PERISCOPE, INSTAGRAM, MEERKAT, LINKEDIN, and GOOGLE+.

The content system 306 can receive SM content and can do so in various ways. For example, the content system 306 can receive SM content by obtaining it from another entity, such as a SM platform. In one example, the content system 306 can obtain SM content directly from a SM platform. In another example, the content system 306 can obtain SM content from a SM platform via a SM dashboard application (e.g., TWEETDECK, CYFE, or HOOTSUITE). In some instances, a SM dashboard application can provide additional searching and browsing functionalities (e.g., based on trend analysis or analytics) that may not be provided by the SM platform itself, and/or can provide access to multiple SM platforms through a single user interface.

SM content can include various elements such as (i) data indicating the SM platform from which the SM content was received, (ii) data identifying the publisher of the SM content (e.g., an account identifier, such as a username), (iii) a profile image corresponding to the publisher of the SM content, (iv) text published by the publisher in connection with the SM content, (v) an image published by the publisher in connection with the SM content, (vi) audio content published by the publisher in connection with the SM content, (vii) video content published by the publisher in connection with the SM content (viii) a timestamp indicating a time and/or date at which the SM content was published on the SM platform, (ix) a location (e.g., represented by global positioning system (GPS) coordinates) of the publisher when the SM content was published, (x) a location at which an aspect of the SM content occurred (e.g., where video content was recorded or where a photograph was taken), (xi) a timestamp indicating when an aspect of the SM content occurred, (xii) a number of other users associated with the publisher on a SM platform (e.g., a number of friends or followers), (xiii) an indication of how long the publisher has been a user of a SM platform, (xiv) a number of times the SM content has been shared (e.g., retweeted) by other users of a SM platform, (xv) a number of posts by the publisher on a SM platform, and/or (xvi) any other data that can be integrated into a video program.

The SM system can also store, select, and/or retrieve SM content, perhaps based on input received from a user (e.g., a producer or technical director) via a user interface. As such, the content system 306 can store obtained SM content in a data storage unit (e.g., a data storage unit of the content system 306), and can then receive the SM content by selecting and retrieving it from the data storage unit.

In some instances, the content system 306 can select and modify SM content. The content system 306 can select SM content in various ways. For example, the content system 306 can select SM content responsive to the content system 306 performing an action in connection with the SM content (e.g., responsive to the content system 306 receiving or storing the SM content). In another example, the content system 306 can select SM content based on the SM content being associated with a particular characteristic (e.g., based on the SM content being scheduled to be integrated into a video program). In another example, the content system 306 can, periodically or based on a schedule, select SM content for routine processing. As yet another example, the content system 306 can select SM content based on input received from a user via a user interface.

The content system 306 can then modify the selected SM content by identifying a first element of the selected SM content based on the first element being associated with a particular characteristic, and then modifying the selected SM content by modifying the identified first element of the selected SM content item.

The character generator 308 can perform various acts and/or functions, perhaps based on input received via a user interface. For example, the character generator 308 can receive media content and can use a character generator template and received media content to generate and/or output video content that includes the received media content. The content system 306 can receive media content in various ways. In one example, the content system 306 can receive media content from another entity. For example, the content system 306 can receive video content (e.g., video content originally captured by the end-user device 304) from the content system 306. In another example, the character generator 308 can receive SM content from the content system 306. In another example, the character generator 308 can receive media content by selecting and retrieving it from a data storage unit (e.g., a data storage unit of the content system 306).

The character generator template specifies the manner in which the character generator 308 uses the received media content to generate and/or output the video content. The character generator 308 can create and/or modify a character generator template. Further, the character generator 308 can store, select, and/or retrieve a character generator template. As such, the character generator 308 can store a character generator template in a data storage unit (e.g., a data storage unit of the character generator 308), and can then receive the character generator template by retrieving it from the data storage unit.

The character generator template can specify how the character generator 308 is to receive media content. In one example, the character generator template can do so by specifying that the character generator 308 is to receive media content on a particular input of the character generator 308 (e.g., an input that maps to a particular entity, such as the content system 306). In another example, the character generator template can do so by specifying that the character generator 308 is to receive media content by retrieving it from a particular location of a particular data storage unit (e.g., a data storage unit of the character generator 308).

In one example, the character generator 308 can use an ordered set of media content items to generate video content that includes the media content items in the specified order. This type of generated video content is sometimes referred to in the industry as a "ticker." The media content items can include various types of content, such as text and/or images. The ordered set of media content items can be stored in various forms, such as in the form of an Extensible Markup Language (XML) file.

After the character generator 308 generates and/or outputs video content, the character generator 308 can transmit the video content to another entity, such as the DVE system 310, and/or can store the video content in a data storage unit (e.g., a data storage unit of the character generator 308).

As such, in one example, the character generator 308 can receive media content, can use the media content to generate and/or output video content that includes the media content, and can transmit the video content to the DVE system 310.

The DVE system 310 can use a DVE template to generate and/or output video content. This is sometimes referred to in the industry as the DVE system "executing a DVE." In some instances, the DVE system 310 can execute multiple DVEs in serial or overlapping fashion.

The DVE template specifies the manner in which the DVE system 310 generates and/or outputs video content. The DVE system 310 can create and/or modify a DVE template, perhaps based on input received from a user via a user interface. Further, the DVE system 310 can store and/or retrieve a DVE template, perhaps based on input received from a user via a user interface. As such, the DVE system 310 can store a DVE system template in a data storage unit (e.g., a data storage unit of the DVE system 310), and can then receive the DVE template by selecting and retrieving it from the data storage unit.

In some instances, the DVE system 310 can use the DVE template and media content to generate and/or output video content that includes the media content. The DVE system 310 can receive content in various ways. For example, the DVE system 310 can do so by receiving it from another entity, such as the video source 302 and/or the character generator 308. In another example, the DVE system 310 can do so by selecting and retrieving it from a data storage unit (e.g., a data storage unit of the DVE system 310).

The DVE template can specify how the DVE system 310 is to receive media content. In one example, the DVE template can do so by specifying that the DVE system 310 is to receive media content on a particular input of the DVE system 310 (e.g., an input that maps to a particular entity, such as the video source 302 or the character generator 308). In another example, the DVE template can do so by specifying that the DVE system 310 is to receive content by retrieving it from a particular location of a particular data storage unit (e.g., a data storage unit of the DVE system 310).

A DVE template can be configured in various ways, which can allow the DVE system 310 to execute various types of DVEs. In one example, a DVE template can specify that the DVE system 310 is to receive video content from the video source 302 and other media content (e.g., local weather content) from a data storage unit of the DVE system, and is to overlay the other media content on the video content, thereby generating a modified version of the video content. As such, in one example, the DVE system 310 can generate video content by modifying video content.

Figure 4A:
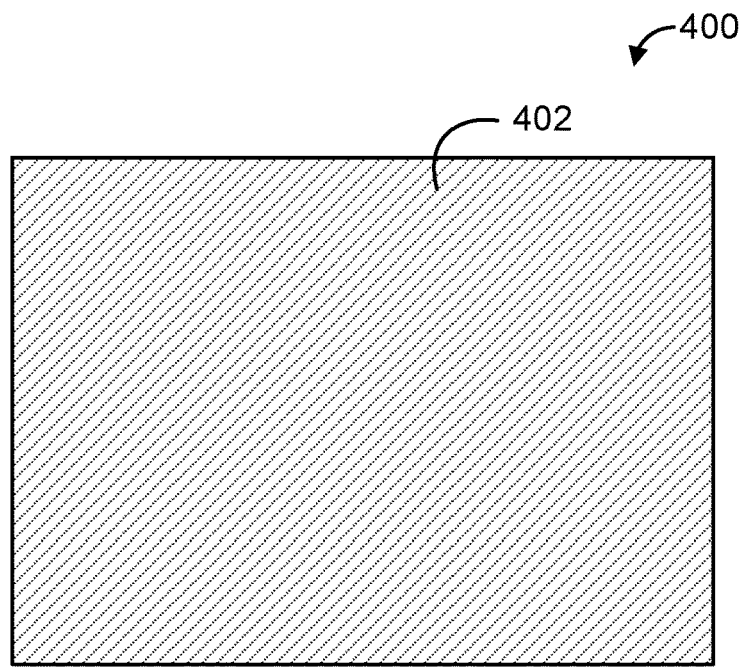
FIG. 4A is a simplified diagram of an example frame of video content, without content overlaid thereon.
Figure 4B:
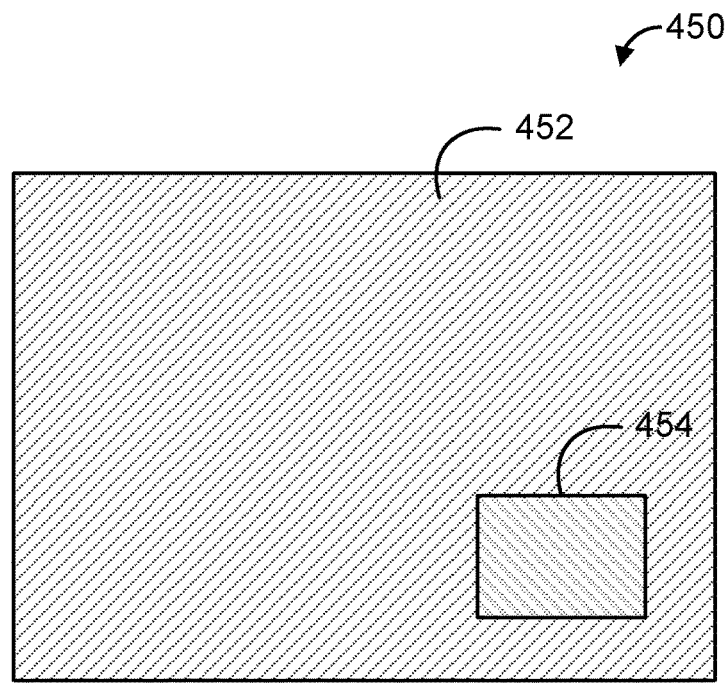
FIG. 4B is a simplified diagram of an example frame of video content, with content overlaid thereon.

FIGS. 4A and 4B help illustrate this concept of overlaying other content on video content. FIG. 4A is a simplified depiction of an example frame 400 of video content. Frame 400 includes content 402, but does not include other content overlaid on content 402. For comparison, FIG. 4B is a simplified depiction of another example frame 450 of video content. Frame 450 includes content 452 and other content 454 overlaid on content 452.

In another example, a DVE template can specify that the DVE system 310 is to receive first video content from the video source 302 and second video content from the character generator 308, and is to overlay the second video content on the first video content, thereby generating a modified version of the first video content.

In another example, a DVE template can specify that the DVE system 310 is to receive first video content from the video source 302 and second video content from the character generator 308, and is to scale-down and re-position the first video content and the second video content, each in a respective one of two windows positioned side-by-side. As such, the DVE system 310 can generate video content by scaling and/or re-positioning video content.

After the DVE system 310 generates and/or outputs the video content, the DVE system 310 can transmit the video content to another entity, such as the VBS 204, or can store the video content in a data storage unit (e.g., a data storage unit of the DVE system 310).

As such, in one example, the DVE system 310 can receive first video content including video content, can use the first video content to generate and/or output second video content that includes the video content. This is an example way in which the VPS 202 can integrate video content into a video program.

The VPS 202 can also integrate video content into a video program in other ways. For example, in the case where the video source 302 is a video camera, the content system 306 can include a display device that is located within a field of the view of the video camera while the video camera records video content that serves as or is made part of the video program. In one example, the display device can be touch-enabled, which can allow a user (e.g., a news anchor) to interact with the video content. To facilitate the user's interaction with the video content, the display device and/or other components of the content system 306 can be programmed with instructions that cause particular actions in response to particular touch commands.

The scheduling system 312 can perform various acts and/or functions related to the scheduling of video content production. For example, the scheduling system 312 can create and/or modify a program schedule of a video program, perhaps based on input received from a user via a user interface. Further, the scheduling system 312 can store and/or retrieve a program schedule, perhaps based on input received from a user via a user interface. As such, the scheduling system 312 can store a program schedule in a data storage unit (e.g., a data storage unit of the scheduling system 312), and can then receive the program schedule by selecting and retrieving it from the data storage unit. The scheduling system 312 can also transmit a program schedule to another entity, such as the sequencing system 314.

The sequencing system 314 can process records in the program schedule. This can cause the sequencing system 314 to control one or more other components of the VPS 202 to facilitate the VPS 202 generating and/or outputting video content, which can serve as or be part of a video program. For example, the sequencing system 314 can control the video source 302, the content system 306, the character generator 308, and/or the DVE system 310 to perform the various acts and/or functions described in this disclosure.

The sequencing system 314 can receive a program schedule in various ways. For example, the sequencing system 314 can do so by receiving it from another entity, such as the scheduling system 312. In another example, the character generator 308 can do so by selecting and retrieving it from a data storage unit (e.g., a data storage unit of the scheduling system 312).

A program schedule (sometimes referred to in the industry as a "rundown") serves as a schedule or outline of a video program and can include multiple records. A video program can be conceptually divided into multiple logically-separated portions (sometimes referred to in the industry as "stories"). As such, each portion of the video program can be represented by a separate record of the program schedule. In some cases, each record can also include one or more sub-records. Each record (including a sub-record) can include various types of data.

FIG. 5 is a simplified diagram of an example program schedule 500. The program schedule 500 includes ten records represented as ten ordered rows. Each record corresponds to a respective portion of a video program, except for one which corresponds to a commercial break. For each portion, the respective record specifies at least one data item that corresponds to that portion of the video program. In particular, each record specifies at least one of a story title, a video content item identifier, a duration, and a DVE identifier (which can serve as an instruction to execute the identified DVE).

A video content item can consist of logically-related video content. For example, a video content item can be a commercial. As another example, a video content item can be a portion of a television program that is scheduled between two commercial breaks. This is sometimes referred to in the industry as a "program segment."

As shown in FIG. 5, the first record specifies a story title of STORY A, a video content identifier of VCI ID A, a duration of 00:02:00:00 (in hours::minutes::seconds::frames format), and a DVE identifier of DVE ID A. As such, upon the sequencing system 314 processing the first record, the sequencing system 314 can cause the video source 302 to playout a video content item identified by the identifier VCI ID A for two minutes, and can further cause the DVE system 310 to execute a DVE identified by the identifier DVE ID A, which for example, can cause the DVE system 310 to overlay content on the identified video-content item.

The program schedule 500 has been greatly simplified for the purposes of illustrating certain features. In practice, a program schedule is likely to include significantly more data.

In some instances, the sequencing system 314 can process a next record in the program schedule based on a trigger event. In one example, the trigger event can be the sequencing system 314 completing one or more actions related to a current record in the program schedule. In another example, the trigger event can be the sequencing system 314 receiving input from a user via a user interface.

Referring back to FIG. 2, the VBS 204 can receive video content from the VPS 202, which in turn can transmit the video content to the end-user device 206 for presentation of the video content to an end user. In practice, the VBS 204 can transmit video content to a large number of end-user devices for presentation of the video content to a large number of end users. The VBS 204 can transmit video content to the end-user device 206 in various ways. For example, VBS 204 can transmit video content to the end-user device 206 over-the-air or via a packet-based network such as the Internet. The end-user device 206 can receive video content from the VBS 204, and can present the video content to an end user via a user interface.

As noted above, the end-user device 304 can capture video content and, at or about the same time that the video content is being captured (i.e., without significant delay), can transmit the captured video content to another entity, such as the content system 306. In some cases, some or all of the other operations described in this disclose can also be performed at or about that same time, which can allow the VBS 204 to transmit the captured video content to the end-user device 206 as a live transmission.

As discussed above, the end-user device 304 can transmit video content to the VPS 202, which the VPS 202 can integrate into a video program. In turn, the VBS 204 can transmit the video program to the end-user device 206 for presentation of the video program to an end-user. Also, as noted above, the transmission of video content from the end-user device 304 to the VPS 202 can either be a live transmission or a non-live transmission. To improve the viewing experience for the end-user, it may be desirable to inform the end-user of this live/non-live characteristic. The VPS 202 and/or the VBS 204 can perform various acts and/or functions to help provide this feature. These acts and/or functions and related features will now be described.

First, the content system 306 can receive from the end-user device 304 video content transmitted from the end-user device 304. The content system 306 can then determine a live/non-live characteristic of the transmission. The content system can do this in various ways.

As discussed above, the end-user device 304 can determine a live/non-live characteristic of the transmission, and can transmit an indication of this determined characteristic to the content system 306. As such, the content system 306 can receive the indication from the end-user device 304, and can determine the live/non-live characteristic of the transmission based on the received indication.

As also discussed above, the end-user device 304 can determine data indicating a capture time of video content, and can transmit the determined data to the content system 306. In one example, the content system 306 can receive the determined data from the end-user device 304, and can determine the live/non-live characteristic of the transmission based on a comparison between the indicated capture time of the video content and a time at which the content system 306 received the video content. If these times are sufficiently similar, this can suggest that the end-user device 304 captured the video content and, at or about the same, transmitted the captured video content to the content system 306 (i.e., that the transmission is a live transmission). Similarly, if these times are not sufficiently similar, this can suggest that the transmission is not a live transmission. The degree of similarity deemed sufficient for this purpose can vary to suit a desired configuration. For instance, a difference of 5 seconds or less can be considered sufficient to deem the transmission as a live transmission. However, other predefined values can be used for this purpose. In some examples, the degree of similarity (e.g., threshold time difference) may be based on an expected time delay inherent in the communication link between the end-user device 304 and the content system 306, for example.

After the content system 306 determines the live/non-live characteristic of the transmission, the content system 306 can use the determined live/non-live characteristic of the transmission, as a basis for selecting a DVE. The DVE system 310 can then execute the selected DVE, which can cause the DVE system 310 to generate video content.

To illustrate this concept, consider a first scenario where the content system 306 determines that the transmission is a live transmission. In this case, the content system can use this determination as a basis to select a DVE that, when executed, causes the DVE system 310 to generate video content by overlaying on the received video content, content indicating that the received video content is being transmitted live. For example, the overlay content can be the word LIVE or the phrase LIVE VIDEO. In some cases, the overlay content may include an indication of the time at which the received video content was captured, as indicated by the capturing device, such as end-user device 304. However, the selected DVE can be configured to, when executed, cause the DVE system 310 to modify the received video content in other ways. For instance, the DVE system 310 could outline the received video content with a border of a particular color (e.g., red) or could position the received video content within a particular region on the screen (e.g., on the left side) or could position content indicating that the received video content is not being transmitted live immediately above or below the received video content or another position that is not overlaid on the received video content.

To further illustrate the concept of selecting an executing DVE as discussed above, consider a second scenario where the content system 306 determines that the transmission is a non-live transmission. In this case, the content system can use this determination as a basis to select a DVE that, when executed, causes the DVE system 310 to generated video content by overlaying on the received video content, content indicating that the received video content is not being transmitted live. For example, the overlay content can be the phrase RECORDED EARLIER or the phrase PREVIOUSLY RECORDED. In some cases, the overlay content may include an indication of the time at which the received video content was captured, as indicated by the capturing device, such as end-user device 304. However, the selected DVE can be configured to, when executed, cause the DVE system 310 to modify the received video content in other ways. For instance, the DVE system 310 could outline the received video content with a border of a particular color (e.g., white) or could position the received video content within a particular region on the screen (e.g., on the right side) or could position content indicating that the received video content is not being transmitted live immediately above or below the received video content or another position that is not overlaid on the received video content.

In the context of providing this DVE-related feature, the scheduling system 312 can add to a program schedule, a placeholder that the scheduling system 312 can replace with a reference to an appropriate DVE (i.e., the eventually selected DVE), based on the determined live-non-live characteristic. This can allow a producer to schedule when a later-to-be-selected DVE should be executed.

After the DVE system 310 uses the selected DVE to generate video content video, the VBS 204 can transmit the generated video content to the end-user device 206 for presentation of the generated video content to an end-user of the end-user device 206 as described above.

Figure 6:
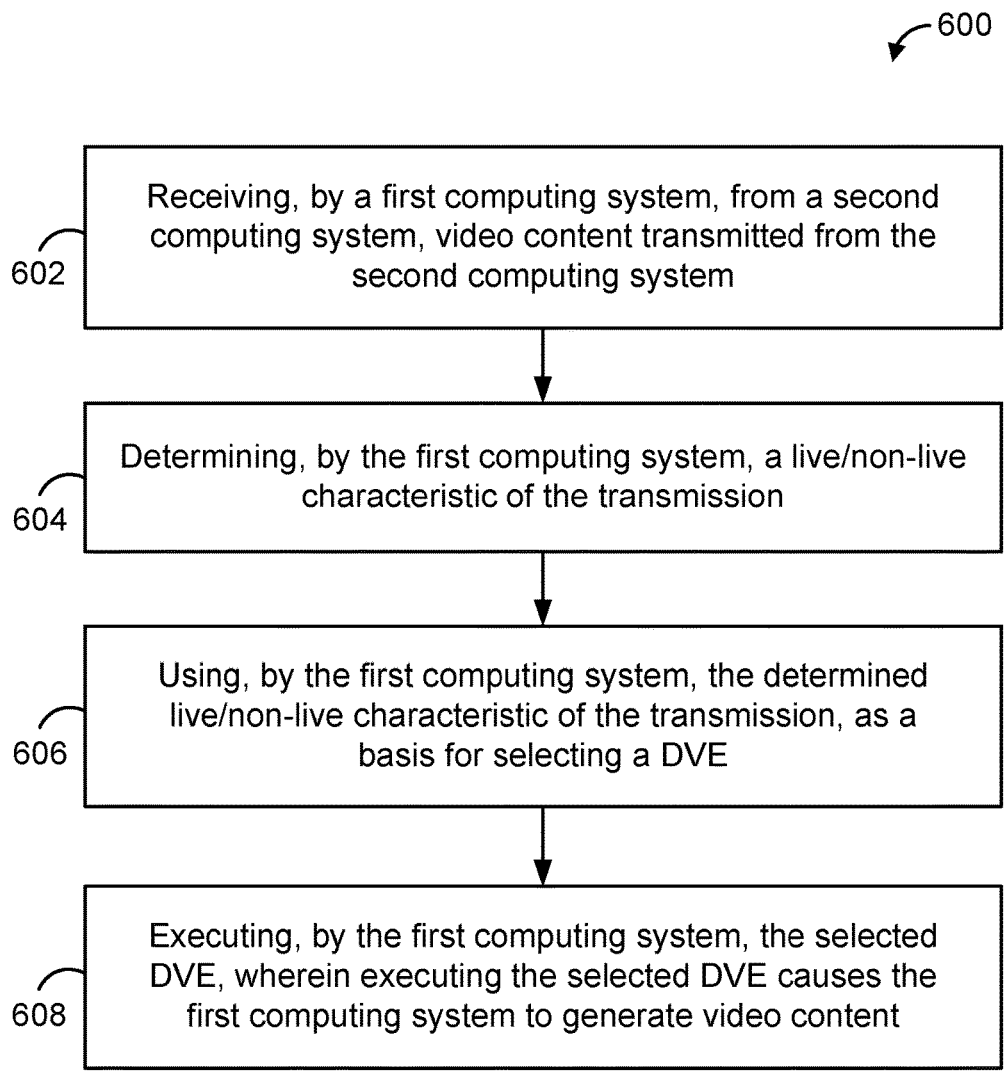
FIG. 6 is a flow chart of an example method.

FIG. 6 is a flow chart illustrating an example method 600.

At block 602, the method 600 can include receiving, by a first computing system, from a second computing system, video content transmitted from the second computing system. In one example, the first computing system can be the VPS 202. In another example, the first computing system can be a computing system that includes the VPS 202 and the VBS 204. Also, in one example, the second computing device can be the end-user device 304.

At block 604, the method 600 can include determining, by the first computing system, a live/non-live characteristic of the transmission.

At block 606, the method 600 can include using, by the first computing system, the determined live/non-live characteristic of the transmission, as a basis for selecting a DVE.

At block 608, the method 600 can include executing, by the first computing system, the selected DVE, wherein executing the selected DVE causes the first computing system to generate video content.

IV. Example Variations

Although some of the acts and/or functions described in this disclosure have been described as being performed by a particular entity, the acts and/or functions can be performed by any entity, such as those entities described in this disclosure. Further, although the acts and/or functions have been recited in a particular order, the acts and/or functions need not be performed in the order recited. However, in some instances, it can be desired to perform the acts and/or functions in the order recited. Further, each of the acts and/or functions can be performed responsive to one or more of the other acts and/or functions. Also, not all of the acts and/or functions need to be performed to achieve one or more of the benefits provided by this disclosure, and therefore not all of the acts and/or functions are required.

Although certain variations have been discussed in connection with one or more example of this disclosure, these variations can also be applied to all of the other examples of this disclosure as well.

Although select examples of this disclosure have been described, alterations and permutations of these examples will be apparent to those of ordinary skill in the art. Other changes, substitutions, and/or alterations are also possible without departing from the invention in its broader aspects as set forth in the following claims.

The invention claimed is:

1. A method comprising:
   receiving, at a reception time, by a first computing system, from a second computing system, a transmission comprising video content transmitted from the second computing system;
   receiving, by the first computing system, from the second computing system, data indicating a capture time of the received video content, wherein the capture time represents a time at which the video content was captured by a camera;
   comparing the reception time to the indicated capture time of the received video content;
   determining, based on the comparison, by the first computing system, that the reception time and the capture time have a sufficient degree of similarity, wherein determining that the reception time and the capture time have a sufficient degree of similarity comprises comparing a difference between the reception time and the capture time to a threshold time difference, and wherein the threshold time difference is an expected time delay associated with a communication link between the first computing system and the second computing system;
   determining, based on the determination that the reception time and the capture time have a sufficient degree of similarity, by the first computing system, a live/non-live characteristic of the transmission, wherein determining the live/non-live characteristic of the transmission comprises determining that the transmission is a live transmission;
   using, by the first computing system, the determined live/non-live characteristic of the transmission, as a basis for selecting a digital-video effect (DVE); and
   executing, by the first computing system, the selected DVE, wherein executing the selected DVE causes the first computing system to generate video content, wherein executing the selected DVE causes the first computing system to generate the video content by overlaying on the received video content as the received video content is being played out, content indicating that the received video content is being transmitted live.

2. The method of claim 1, wherein the first computing system is a video production system.

3. The method of claim 1, further comprising:
   receiving, by the first computing system, from the second computing system, an indication of the live/non-live characteristic of the transmission,
   wherein determining the live/non-live characteristic of the transmission further comprises determining the live/non-live characteristic of the transmission based on the received indication.

4. The method of claim 1, further comprising:
   transmitting, by the first computing system, the generated video content to a third computing system for presentation of the generated video content on the third computing system.

5. The method of claim 1, wherein the threshold time difference is five seconds or less.

6. A non-transitory computer-readable medium having stored thereon program instructions that upon execution by a processor, cause performance of a set of acts comprising:
   receiving, at a reception time, by a first computing system, from a second computing system, a transmission comprising video content transmitted from the second computing system;
   receiving, by the first computing system, from the second computing system, data indicating a capture time of the received video content, wherein the capture time represents a time at which the video content was captured by a camera;
   comparing the reception time to the indicated capture time of the received video content;
   determining, based on the comparison, by the first computing system, that the reception time and the capture time have a sufficient degree of similarity, wherein determining that the reception time and the capture time have a sufficient degree of similarity comprises comparing a difference between the reception time and the capture time to a threshold time difference, and wherein the threshold time difference is an expected time delay associated with a communication link between the first computing system and the second computing system;
   determining, based on the determination that the reception time and the capture time have a sufficient degree of similarity, by the first computing system, a live/non-live characteristic of the transmission, wherein determining the live/non-live characteristic of the transmission comprises determining that the transmission is a live transmission;

using, by the first computing system, the determined live/non-live characteristic of the transmission, as a basis for selecting a digital-video effect (DVE); and executing, by the first computing system, the selected DVE, wherein executing the selected DVE causes the first computing system to generate video content, wherein executing the selected DVE causes the first computing system to generate the video content by overlaying on the received video content as the received video content is being played out, content indicating that the received video content is being transmitted live.

7. The non-transitory computer-readable medium of claim 6, wherein the first computing system is a video production system.

8. The non-transitory computer-readable medium of claim 6, the set of acts further comprising:

receiving, by the first computing system, from the second computing system, an indication of the live/non-live characteristic of the transmission, wherein determining the live/non-live characteristic of the transmission further comprises determining the live/non-live characteristic of the transmission based on the received indication.

9. The non-transitory computer-readable medium of claim 6, the set of acts further comprising:

transmitting, by the first computing system, the generated video content to a third computing system for presentation of the generated video content on the third computing system.

10. A first computing system configured for performing a set of acts comprising:

receiving, at a reception time, by the first computing system, from a second computing system, a transmission comprising video content transmitted from the second computing system;

receiving, by the first computing system, from the second computing system, data indicating a capture time of the received video content, wherein the capture time represents a time at which the video content was captured by a camera;

comparing the reception time to the indicated capture time of the received video content;

determining, based on the comparison, by the first computing system, that the reception time and the capture time have a sufficient degree of similarity, wherein determining that the reception time and the capture time have a sufficient degree of similarity comprises comparing a difference between the reception time and the capture time to a threshold time difference, and wherein the threshold time difference is an expected time delay associated with a communication link between the first computing system and the second computing system;

determining, based on the determination that the reception time and the capture time have a sufficient degree of similarity, by the first computing system, a live/non-live characteristic of the transmission, wherein determining the live/non-live characteristic of the transmission comprises determining that the transmission is a live transmission;

using, by the first computing system, the determined live/non-live characteristic of the transmission, as a basis for selecting a digital-video effect (DVE); and executing, by the first computing system, the selected DVE, wherein executing the selected DVE causes the first computing system to generate video content, wherein executing the selected DVE causes the first computing system to generate the video content by overlaying on the received video content as the received video content is being played out, content indicating that the received video content is being transmitted live.

11. The first computing system of claim 10, wherein the first computing system is a video production system.

12. The first computing system of claim 10, the set of acts further comprising:

receiving, by the first computing system, from the second computing system, an indication of the live/non-live characteristic of the transmission, wherein determining the live/non-live characteristic of the transmission further comprises determining the live/non-live characteristic of the transmission based on the received indication.

* * * * *